(12) United States Patent
Maejima

(10) Patent No.: US 9,647,766 B2
(45) Date of Patent: May 9, 2017

(54) METHOD, COMMUNICATION APPARATUS, AND COMMUNICATION SYSTEM

(71) Applicant: FUJITSU LIMITED, Kawasaki-shi, Kanagawa (JP)

(72) Inventor: Mitsuru Maejima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 14/696,704

(22) Filed: Apr. 27, 2015

(65) Prior Publication Data
US 2015/0381284 A1   Dec. 31, 2015

(30) Foreign Application Priority Data

Jun. 26, 2014  (JP) ................................. 2014-131915

(51) Int. Cl.
| H04B 10/516 | (2013.01) |
| H04Q 11/00 | (2006.01) |
| H04B 10/564 | (2013.01) |
| H04B 10/272 | (2013.01) |
| H04B 10/54 | (2013.01) |
| H04L 12/26 | (2006.01) |

(52) U.S. Cl.
CPC ......... *H04B 10/564* (2013.01); *H04B 10/272* (2013.01); *H04B 10/5161* (2013.01); *H04B 10/541* (2013.01); *H04Q 11/0003* (2013.01); *H04Q 11/0066* (2013.01); *H04L 43/0888* (2013.01); *H04L 43/16* (2013.01); *H04Q 2011/0083* (2013.01)

(58) Field of Classification Search
CPC .. H04B 10/564; H04B 10/272; H04B 10/541; H04B 10/5161; H04Q 11/0003; H04Q 11/0066; H04Q 2011/0083; H04L 43/0888; H04L 43/16

See application file for complete search history.

(56) References Cited

U.S. PATENT DOCUMENTS

| 9,408,147 B2 * | 8/2016 | Polo ................... H04W 52/0229 |
| 2012/0170626 A1 * | 7/2012 | Adachi ............... H04L 27/0008 375/219 |
| 2014/0016502 A1 * | 1/2014 | Miyamoto .......... H04L 27/0008 370/253 |
| 2015/0310736 A1 * | 10/2015 | Yamada ................ G08C 17/02 398/107 |

FOREIGN PATENT DOCUMENTS

| JP | 8-46570 | 2/1996 |
| JP | 2006-345416 | 12/2006 |

* cited by examiner

*Primary Examiner* — Leslie Pascal
(74) *Attorney, Agent, or Firm* — Staas & Halsey LLP

(57) ABSTRACT

A method of communication through a network, executed by a communication apparatus that performs transmission by selecting a transmission mode, the method includes determining whether to transmit the data in either a first mode or a second mode when transmitting data; transmitting the data using a predetermined number of kinds of optical signals having different levels in light intensity when determined to transmit in the first mode; and transmitting the data using a fewer number of kinds of optical signals having different levels in light intensity than the predetermined number when determined to transmit in the second mode.

15 Claims, 12 Drawing Sheets

METHOD, COMMUNICATION APPARATUS, AND COMMUNICATION SYSTEM

CROSS-REFERENCE TO RELATED APPLICATION

This application is based upon and claims the benefit of priority of the prior Japanese Patent Application No. 2014-131915, filed on Jun. 26, 2014, the entire contents of which are incorporated herein by reference.

FIELD

The embodiments discussed herein are related to a method, a communication apparatus, and a communication system.

BACKGROUND

In recent years, a shift toward renewable energy, and electric power saving in electrical and electronic devices are progressing. Research and development in electric power saving are conducted continuously because of the fact that much of the energy resources of the nation's electric power depends on imports.

In information infrastructure, such as data centers, and the like, which supports information and communication technology (ICT), with the amount of data traffic that increases year by year, power supply is on the rise. Accordingly, electric power saving is promoted. For example, in systems that are used in data centers, and the like, optical communication systems using a phase-modulated optical signal generated by selecting one of a plurality of optical signals having different phases and time multiplexing, or the like are known. As related art, for example, Japanese Laid-open Patent Publication No. 2006-345416, and Japanese Laid-open Patent Publication No. 8-46570 are disclosed.

For electric power saving in an optical communication system, and the like, a method change in optical communication, or the like is considered. However, a method change is carried out after data communication in a system is stopped once so that the method change has a high risk. For this reason, electric power saving in an existing system is difficult in particular.

SUMMARY

According to an aspect of the invention, a method of communication through a network, executed by a communication apparatus that performs transmission by selecting a transmission mode, the method includes determining whether to transmit the data in either a first mode or a second mode when transmitting data; transmitting the data using a predetermined number of kinds of optical signals having different levels in light intensity when determined to transmit in the first mode; and transmitting the data using a fewer number of kinds of optical signals having different levels in light intensity than the predetermined number when determined to transmit in the second mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a detailed description will be given of a communication apparatus, a relay apparatus, and a communication system according to embodiments of the present disclosure with reference to the drawings. This disclosure is not limited to the embodiments. It is possible to suitably combine individual embodiments as long as they do not contradict with each other.

First Embodiment

Figure 1:
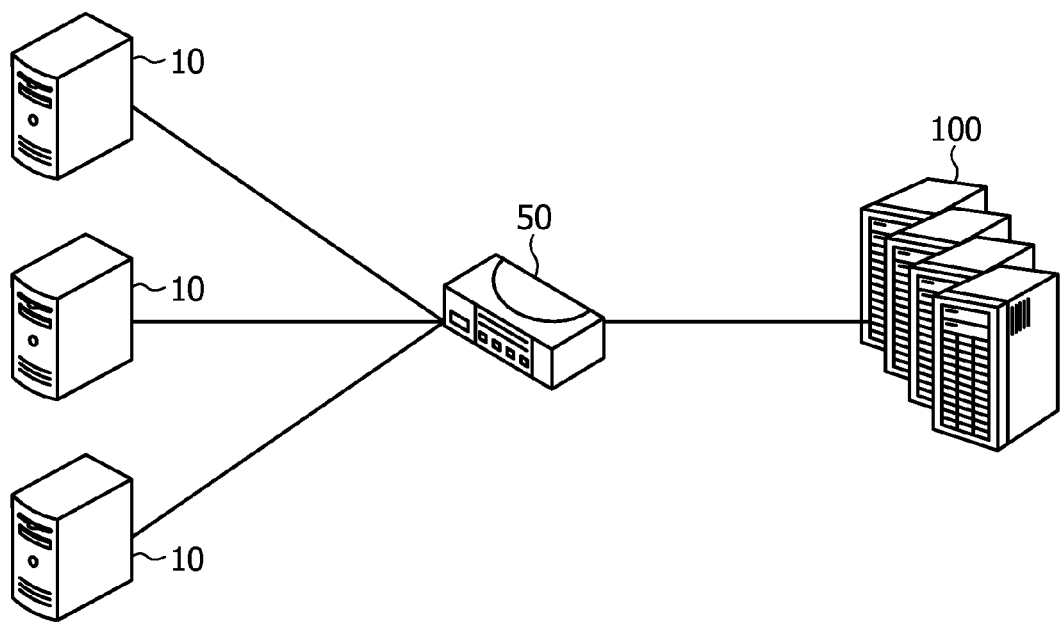
FIG. 1 is a diagram illustrating an example of an overall configuration a system according to a first embodiment.

FIG. 1 is a diagram illustrating an example of an overall configuration a system according to a first embodiment. As illustrated in FIG. 1, this system is an information processing system including a plurality of servers 10, a switch 50, and a storage apparatus 100. The information processing system is a system configured as a storage area network (SAN), for example. The information processing system is installed in a data center, or the like.

Each of the servers 10 is an example of a communication apparatus connected to the switch 50 using a fiber channel. The server 10 performs writing data to and reading data from the storage apparatus 100 through the switch 50.

The switch 50 is an example of a relay apparatus that is connected to the server 10, and the storage apparatus 100 through the fiber channels, respectively, and relays data frames between the server 10 and the storage apparatus 100. For example, the switch 50 relays a data write request or a data read request, which is received from the server 10, to the storage apparatus 100. The switch 50 relays various replies received from the storage apparatus 100 to the server 10.

The storage apparatus 100 is an example of a storage device that is connected to the switch 50 using a fiber channel, and stores various kinds of data. For example, the storage apparatus 100 stores data transmitted by the server 10. Then, the storage apparatus 100 reads the data requested by the server 10, and replies to the server 10.

In such a state, the server 10 determines whether to transmit a data frame in a normal mode or in a power saving mode at the time of transmitting the data frame through optical communication. Then, when determined to transmit in the normal mode, the server 10 transmits a data frame using a multilevel optical signal. On the other hand, when determined to transmit in the power saving mode, the server 10 transmits a data frame using a single level optical signal. The normal mode is an example of a first mode. The power saving mode is an example of a second mode.

That is to say, when the server 10 transmits a data frame to the storage apparatus 100, the server 10 performs transmission using the multilevel laser light at the time of a normal mode, and switches to single level laser light at the time of a low power mode so as to change the optical level for each frame. As a result, it is possible for the server 10 to achieve electric power saving while the system in operation.

Figure 2:
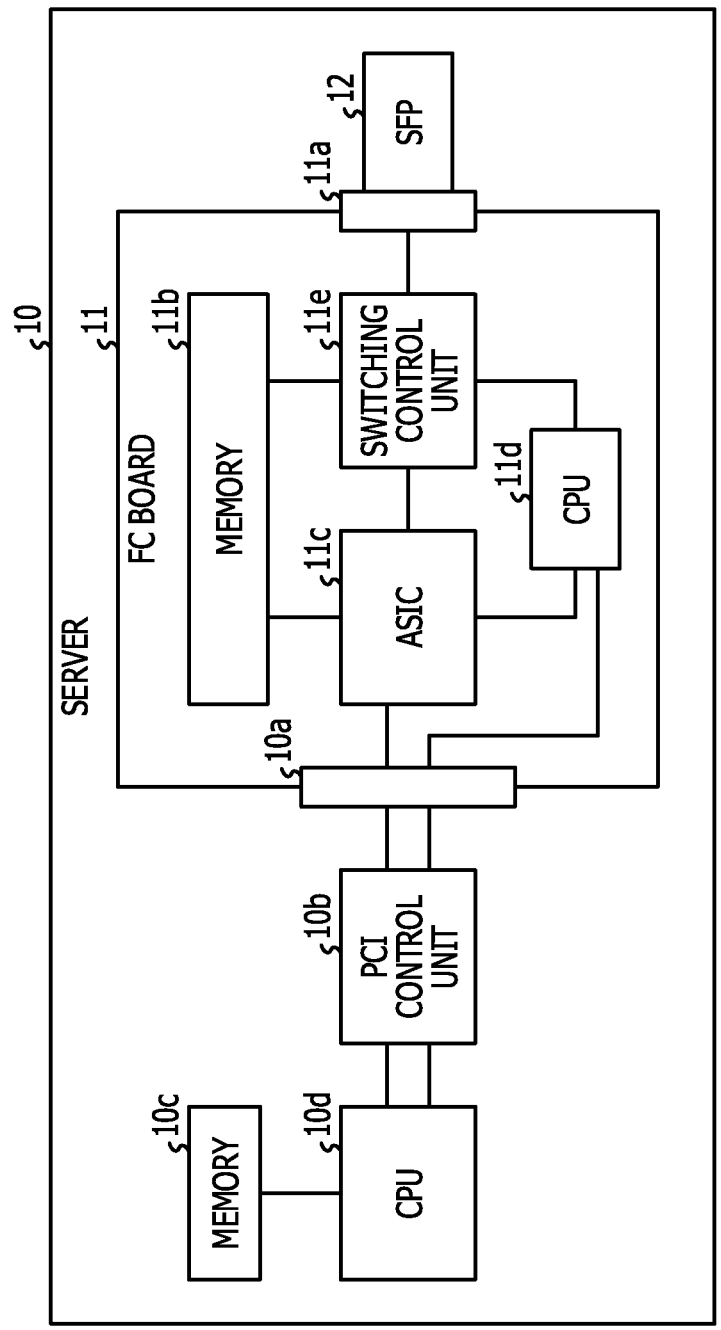
FIG. 2 is a diagram illustrating an example of a hardware configuration of a server according to the first embodiment.

FIG. 2 is a diagram illustrating an example of a hardware configuration of a server according to the first embodiment. As illustrated in FIG. 2, the server 10 includes a connector 10a, a peripheral components interconnect (PCI) control unit 10b, a memory 10c, a central processing unit (CPU) 10d, a fiber channel (FC) board 11, and a small form-factor pluggable (SFP) 12.

The connector 10a includes a PCI connection port. The connector 10a connects the main unit of the server 10, and the FC board 11 using the PCI connection port. The PCI control unit 10b controls data communication between the main unit of the server 10, and the FC board 11 using the PCI. The memory 10c is a storage device that stores various programs and data. The CPU 10d is a processing unit that controls overall processing of the server 10.

The CPU 10d generates a data frame. Then, the CPU 10d determines whether to perform transmission either in the normal mode or in the power saving mode when transmitting the generated data frame to a destination. Then, the CPU 10d outputs a transmission instruction in the determined mode to the FC board 11. For example, the CPU 10d measures the amount of data traffic for each unit time. Then, the CPU 10d determines to perform transmission in the power saving mode when the observed amount of data traffic is less than a threshold value. As another example, when the CPU 10d receives a switching instruction from an external apparatus, such as an administrator, or the like, the CPU 10d determines to perform transmission in the power saving mode.

The FC board 11 includes a connector 11a, a memory 11b, an application specific integrated circuit (ASIC) 11c, a CPU 11d, and a switching control unit 11e. The FC board 11 performs data communication using the fiber channel.

The connector 11a connects the FC board 11 and the SFP 12. The memory 11b is a storage device storing various programs and data. The ASIC 11c performs control on the data frame in the server 10. For example, the ASIC 11c receives a data frame from the server 10, and outputs the data frame to the switching control unit 11e. The ASIC 11c outputs the data frame received by the FC board 11 to the CPU 10d of the main unit of the server 10.

The CPU 11d performs switching of the normal mode and the power saving mode in accordance with a switching instruction received from the main unit of the server 10. Then, the CPU 11d outputs a determination of transmitting in either of the modes to the switching control unit 11e. The switching control unit 11e is a processing unit that executes the actual switching processing. The switching control unit 11e generates a data frame for the normal mode data frame or a data frame for the power saving mode in accordance with the instruction received from the CPU 11d. Then, the switching control unit 11e outputs the data frame and the transmission instruction to the SFP 12.

The SFP 12 is a module that controls data transfer among the devices using a vertical-cavity surface-emitting laser (VCSEL) chip. The SFP 12 converts the electrical signal to an optical signal to transmit a data frame. The SFP 12 converts an optical signal received from the outside into an electrical signal to receive a data frame.

For example, when the SFP 12 receives a transmission instruction in the normal mode, the SFP 12 transmits a data frame using a multibit (MLC) optical signal, to put it differently, a multilevel optical signal.

On the other hand, when the SFP 12 receives a transmission instruction in the power saving mode, the SFP 12 transmits a data frame using a single bit (SLC) optical signal, to put it differently, a single level optical signal. At this time, the SFP 12 transmits a header part of a data frame in the MLC optical signal. Then, at the time of transmitting a data part of a data frame, the SFP 12 switches from MLC to SLC, and transmits the data part using the SLC optical signal.

Here, a description has been given of the configuration in FIG. 2 as an example of a hardware configuration of a server. However, it is possible to use the same hardware configuration for the storage apparatus 100 as that in FIG. 2.

Figure 3:
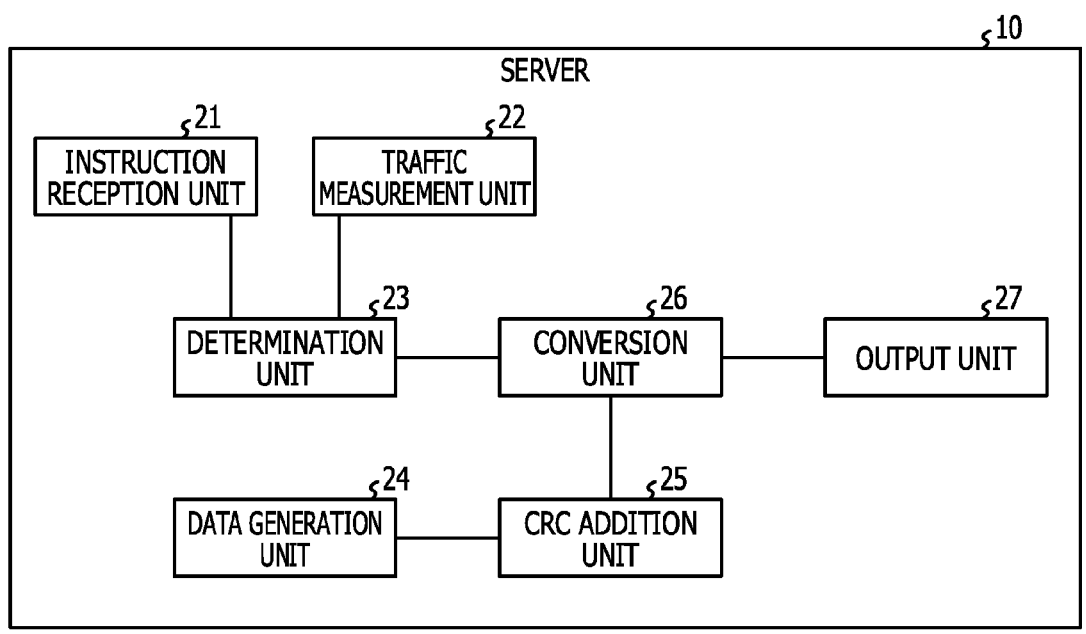
FIG. 3 is a functional block diagram illustrating a functional configuration of the server according to the first embodiment.

FIG. 3 is a functional block diagram illustrating a functional configuration of the server according to the first embodiment. As illustrated in FIG. 3, the server 10 includes an instruction reception unit 21, a traffic measurement unit 22, a determination unit 23, a data generation unit 24, a cyclic redundancy check (CRC) addition unit 25, a conversion unit 26, and an output unit 27.

The function units illustrated here are executed by the hardware illustrated in FIG. 2, and the like. For example, the instruction reception unit 21, the traffic measurement unit 22, and the data generation unit 24 are the function units that are executed by the CPU 10d of the main unit of the server 10 illustrated in FIG. 2. The determination unit 23 is a function unit that is executed by the CPU 11d of the FC board 11 or the CPU 10d of the main unit of the server 10, which is illustrated in FIG. 2. The CRC addition unit 25, and the conversion unit 26 are function units that are executed by the switching control unit 11e of the FC board 11 illustrated in FIG. 2. The output unit 27 is a function unit that is executed by the SFP 12 illustrated in FIG. 2.

The instruction reception unit 21 receives a switching instruction from the normal mode to the power saving mode, or a switching instruction from the power saving mode to the normal mode from an administrator, or the like, and outputs the instruction to the determination unit 23. The traffic measurement unit 22 measures the amount of traffic per unit time at predetermined intervals. Then, the traffic measurement unit 22 output the result to the determination unit 23.

The determination unit 23 determines the mode to be used at transmission time based on a switching instruction or the amount of traffic from the outside for each data frame, and executes transmission. For example, when the instruction reception unit 21 receives an instruction of the normal mode or the power saving mode, the determination unit 23 determines the received mode to be the transmission mode. When the amount of traffic per unit time, which was measured by the traffic measurement unit 22 is equal to or less than a threshold value, the determination unit 23 determines to perform transmission in the power saving mode.

The data generation unit 24 executes an application, or the like to generate a data frame. Specifically, the data generation unit 24 generates a data frame including various kinds of information given in the four-valued notation as a data frame for the normal mode. That is to say, the data generation unit 24 generates a data frame in the four-valued notation for a multilevel optical signal to be used at a normal time.

Figure 4:
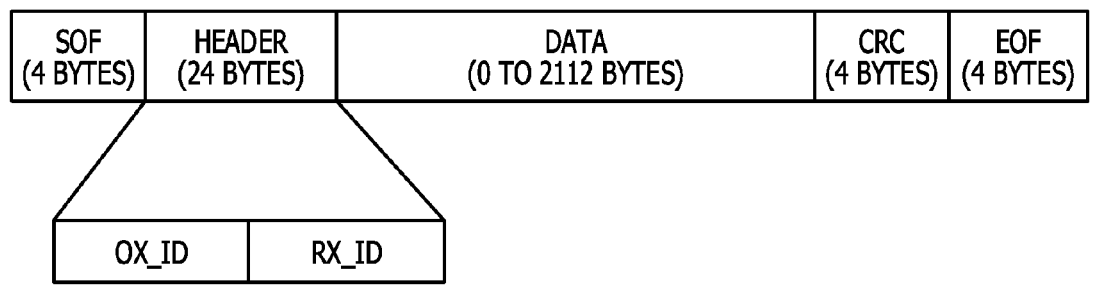
FIG. 4 is a diagram illustrating an example of a structure of a data frame.

FIG. 4 is a diagram illustrating an example of a configuration of a data frame. As illustrated in FIG. 4, the generated data frame includes a 4-byte SOF, a 24-byte header, data having a maximum of 2112 bytes, a 4-byte CRC, and a 4-byte EOF.

The SOF is an area storing information indicating the start of a data frame. The header is an area in which information on the data of the data frame itself is stored. The header includes an OX_ID, which is a 4-byte user area. The OX_ID is an area in which any information may be stored. The data is an area in which the data to be transmitted itself is stored. The CRC is an area in which information to be used for error detection is stored. The EOF is an area in which information indicating the end of the data frame is stored.

The CRC addition unit 25 adds a CRC code to the CRC area of the data frame output from the data generation unit 24. For example, the CRC addition unit 25 adds a CRC code in the four-valued notation to the CRC area of the data frame including the data area in the four-valued notation. Then, the CRC addition unit 25 outputs the data frame to which the CRC code has been added to the conversion unit 26.

The conversion unit 26 converts the data stored in the data area of the data frame input from the CRC addition unit 25 into data suitable for the normal mode or the power saving mode. Specifically, when determined to transmit in the normal mode, the conversion unit 26 directly uses the data frame generated by the data generation unit 24 without conversion. Then, the conversion unit 26 outputs the data frame, and the transmission instruction using the multilevel to the output unit 27.

On the other hand, when determined to transmit in the power saving mode, the conversion unit 26 converts the data area of the data frame generated by the data generation unit 24 into the binary notation. Further, the conversion unit 26 sets information indicating the binary notation in the header area of the data frame. To give an example, the conversion unit 26 converts the value of the OX_ID value of the header from 0000 to 0010. Then, the conversion unit 26 outputs the data frame after conversion, and the transmission instruction using the single level to the output unit 27.

Figure 5:
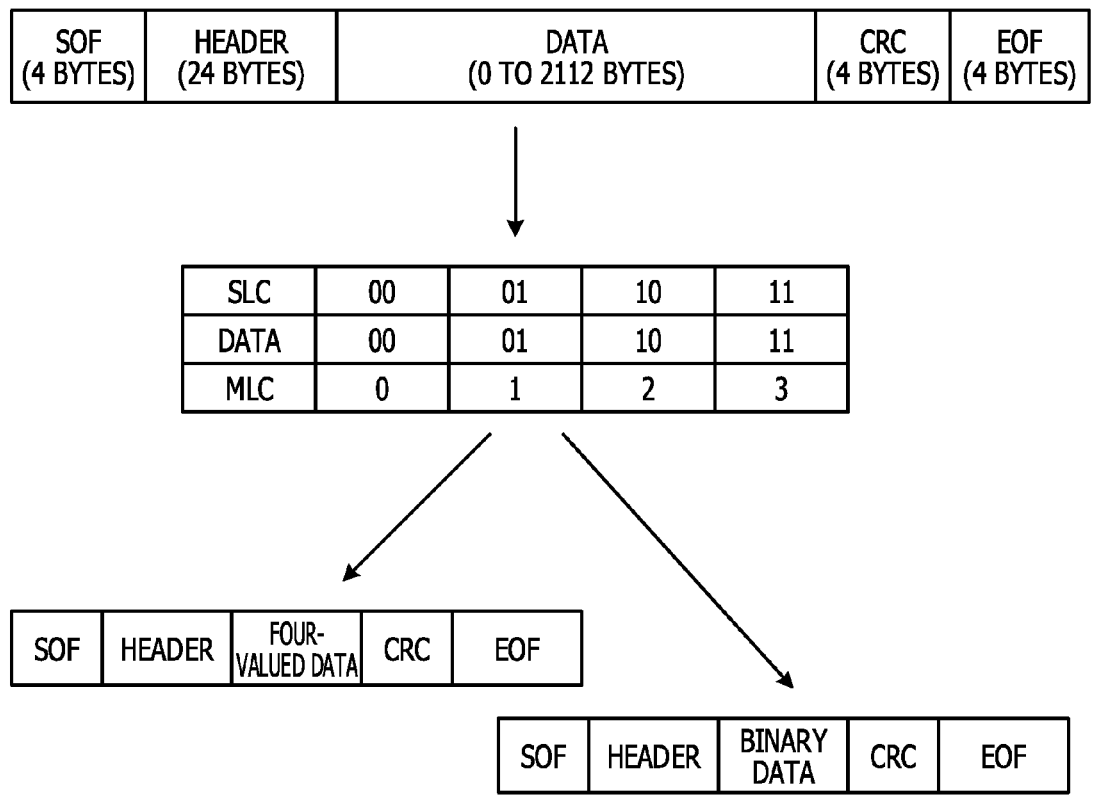
FIG. 5 is a diagram illustrating a data conversion example of a data frame.

FIG. 5 is a diagram illustrating a data conversion example of a data frame. As illustrated in FIG. 5, when determined to transmit in the normal mode, the conversion unit 26 keeps the data area of the data frame as four-valued data in the four-valued notation without change. For example, as an example of the four-valued notation, if the data is 00, the data becomes 0 in the four-valued notation, else if the data is 01, the data becomes 1 in the four-valued notation, else if the data is 10, the data becomes 2 in the four-valued notation, and else if the data is 11, the data becomes 3 in the four-valued notation.

When determined to transmit in the power saving mode, the conversion unit 26 converts the data area of the data frame from the four-valued data in the four-valued notation into the binary data in the binary notation. For example, if the data is 0 in the four-valued notation, the conversion unit 26 converts the data into 00 in the binary notation, else if the data is 1 in the four-valued notation, the conversion unit 26 converts the data into 01 in the binary notation, else if the data is 2 in the four-valued notation, the conversion unit 26 converts the data into 10 in the binary notation, and else if the data is 3 in the four-valued notation, the conversion unit 26 converts the data into 11 in the binary notation.

The output unit 27 transmits the data frame using laser light. For example, when the output unit 27 receives an instruction using the multilevel optical signal from the conversion unit 26, the output unit 27 transmits the data frame received from the conversion unit 26 using multilevel laser light. On the other hand, when the output unit 27 receives an instruction to use a single level optical signal, the output unit 27 transmits data other than the data area of the data frame to be transmitted using multilevel laser light. Then, the output unit 27 transmits the data area using the single-level laser light.

Figure 6:
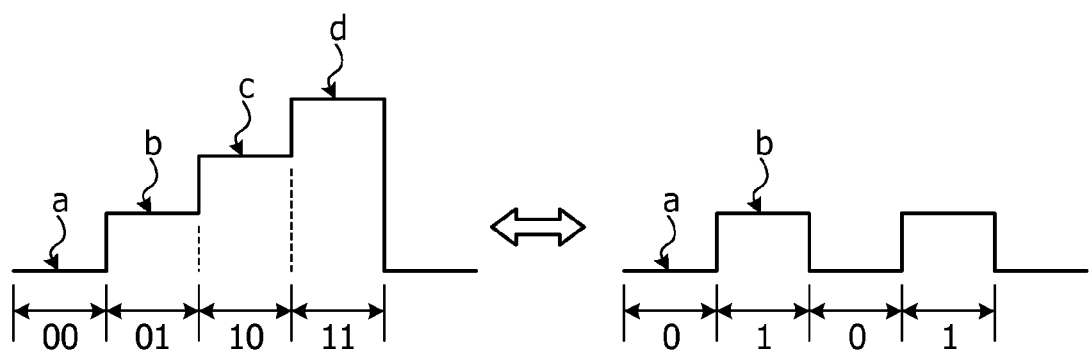
FIG. 6 is an explanatory diagram of optical levels of laser light.

FIG. 6 is an explanatory diagram of optical levels of laser light. As illustrated in FIG. 6, multilevel laser light includes four light intensity levels; a, b, c, and d. It is possible to express 00, 01, 10, and 11 by four values (for example, 0, 1, 2, and 3) using the optical signal of these intensity levels. On the other hand, the single level laser light includes two light intensity levels; a and b. It is possible to express two values; 0 and 1 using the optical signal of these levels. That is to say, the multilevel laser light has the amount of information two times that of the single level laser light.

In this manner, the output unit 27 transmits a data frame using the four-valued multilevel laser light in the normal mode. On the other hand, in the power saving mode, the output unit 27 transmits a data frame using the binary single level laser light.

It is possible for the output unit 27 to use the lowest level light out of the multilevel laser light when using a single level laser light. By this method, it is possible to use only a module that issues multilevel laser light without using a plurality of modules that issue laser light, and thus to reduce cost.

For example, when the output unit 27 transmits data 00 using multilevel laser light, the output unit 27 transmits the optical signal having an optical level of a. When the output unit 27 transmits data 10 using multilevel laser light, the output unit 27 transmits the optical signal having an optical level of c. When the output unit 27 transmits data 0 using single level laser light, the output unit 27 transmits the optical signal having an optical level of a. When the output unit 27 transmits data 1, the output unit 27 transmits the optical signal having an optical level of b.

A description will be given of an example of the reception side of the server. On the reception side, a value "0000", which indicates the four-valued notation, is set in the header of a data frame. If the optical level of the received optical signal is a, the reception side detects reception of data "00". A value 0100, which indicates the binary notation, is set in the header of a data frame, and if the optical level of the received optical signal is a, the reception side detects reception of data "0".

Figure 7:
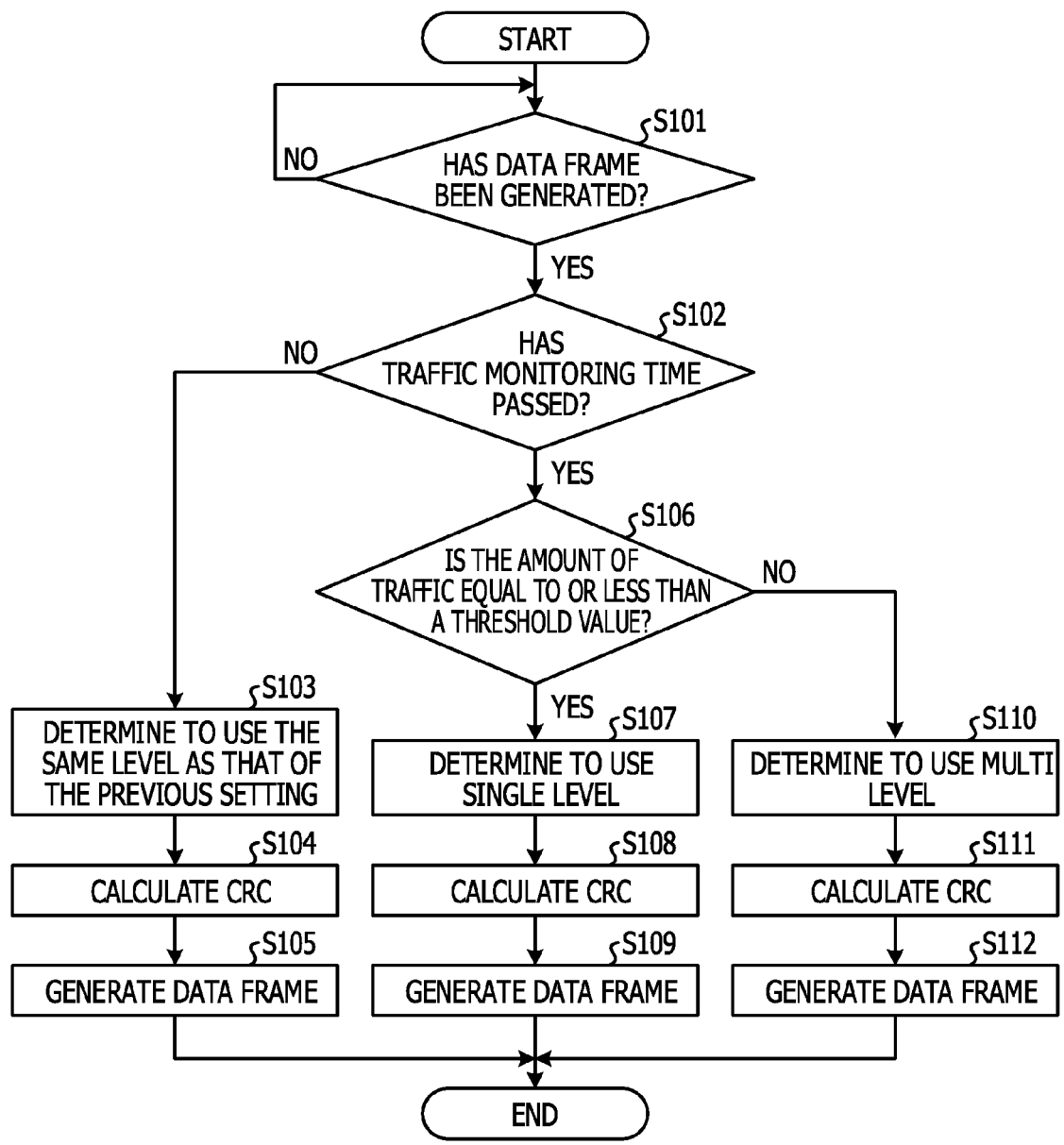
FIG. 7 is a flowchart illustrating a flow of data generation processing performed by the server according to the first embodiment.

FIG. 7 is a flowchart illustrating a flow of data generation processing performed by the server according to the first embodiment. As illustrated in FIG. 7, when the data generation unit 24 of the server 10 generates a data frame in the four-valued notation (S101: Yes), the determination unit 23 determines whether a traffic monitoring time has passed or not (S102).

Then, if the determination unit 23 determines that the traffic monitoring time has not passed yet (S102: No), the determination unit 23 determines to use an optical signal having the same level as the previous setting (S103). After that, the CRC addition unit 25 calculates a CRC to be stored in the generated data frame in the four-valued notation (S104). Then, the CRC addition unit 25 generates the data frame in the four-valued notation, in which the calculated CRC code is stored (S105).

On the other hand, if the determination unit 23 determines that the traffic monitoring time has passed (S102: Yes), the determination unit 23 determines whether the amount of traffic measured by the traffic measurement unit 22 is equal to or less than a threshold value (S106).

Then, if the determination unit 23 determines that the amount of traffic is equal to or less than the threshold value (S106: Yes), the determination unit 23 determines that the optical level of the laser light to be used for the data communication is the single level (S107). After that, the CRC addition unit 25 calculates a CRC code to be stored in the generated data frame in the four-valued notation (S108), and generates the data frame in the four-valued notation, in which the CRC code is stored (S109).

On the other hand, if the determination unit 23 determines that the amount of traffic is greater than the threshold value (S106: No), the determination unit 23 determines the optical level of the laser light to be used for the data communication to be a multilevel (S110). After that, the CRC addition unit 25 calculates the CRC to be stored in the generated data frame in the four-valued notation (S111), and generates the data frame storing the CRC code in the four-valued notation (S112).

Flow of Data Conversion Processing

Figure 8:
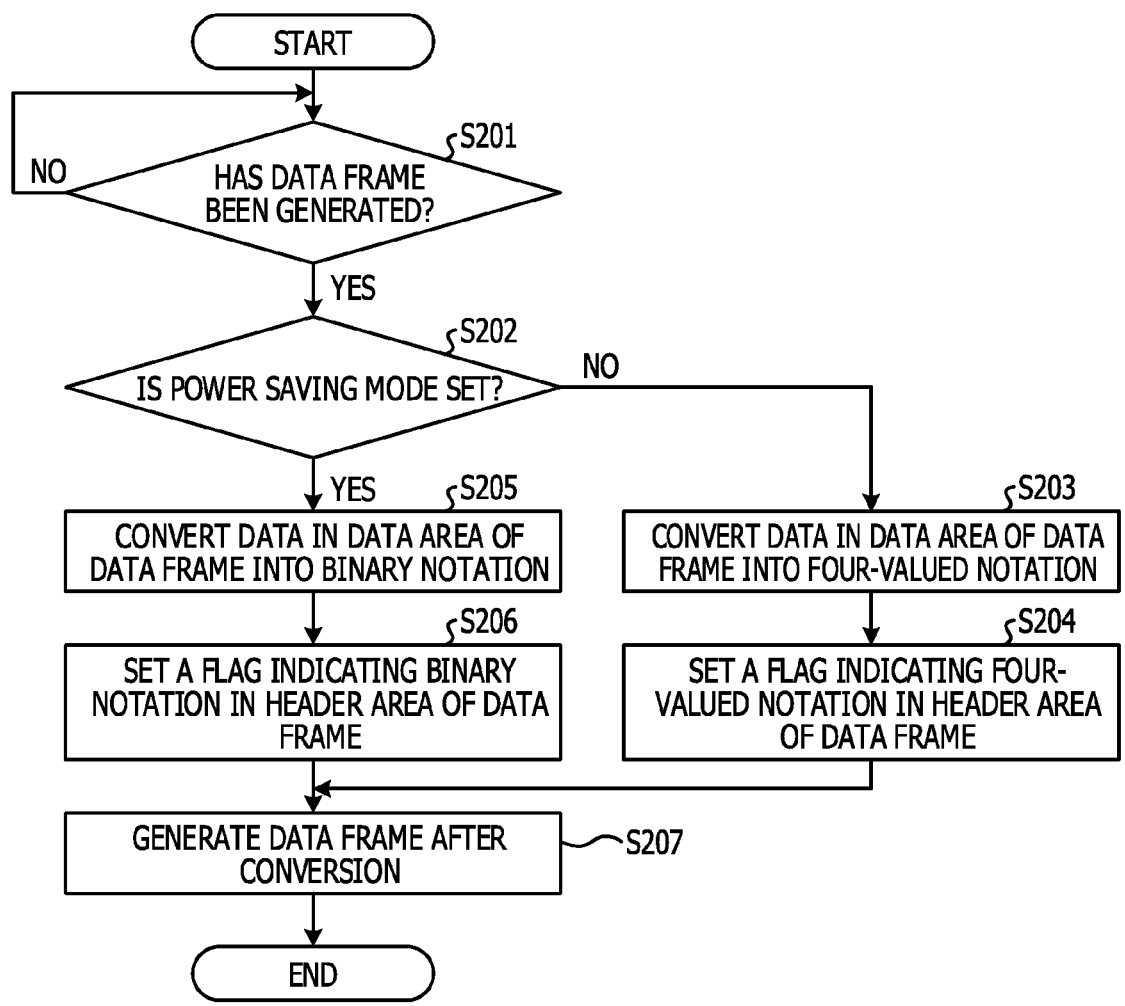
FIG. 8 is a flowchart illustrating a flow of data conversion processing performed by the server according to the first embodiment.

FIG. 8 is a flowchart illustrating a flow of data conversion processing performed by the server according to the first embodiment. As illustrated in FIG. 8, when a data frame in the four-valued notation to be transmitted occurs (S201: Yes), the conversion unit 26 of the server 10 determines whether the power saving mode is set or not (S202). For example, the conversion unit 26 determines whether the determination unit 23 has determined to use either of the modes.

Then, if the conversion unit 26 determines that the power saving mode is not set (S202: No), the conversion unit 26 converts the data in the data area of the data frame into the four-valued notation (S203). If the data before the conversion is the data in the four-valued notation, it is possible to omit this processing. After that, the conversion unit 26 sets a flag indicating the four-valued notation in the header area of the data frame (S204). For example, the conversion unit 26 sets 0000, or the like in the header area.

On the other hand, if the conversion unit 26 determines that the power saving mode is set (S202: Yes), the conversion unit 26 converts the data in the data area in the data frame into the binary notation (S205). After that, the conversion unit 26 sets a flag indicating the binary notation in the header area of the data frame (S206). For example, the conversion unit 26 sets 0100, or the like in the header area.

In this manner, the conversion unit 26 performs from S201 to S206 so as to generate the data frame after conversion (S207).

Flow of Data Transmission Processing

Figure 9:
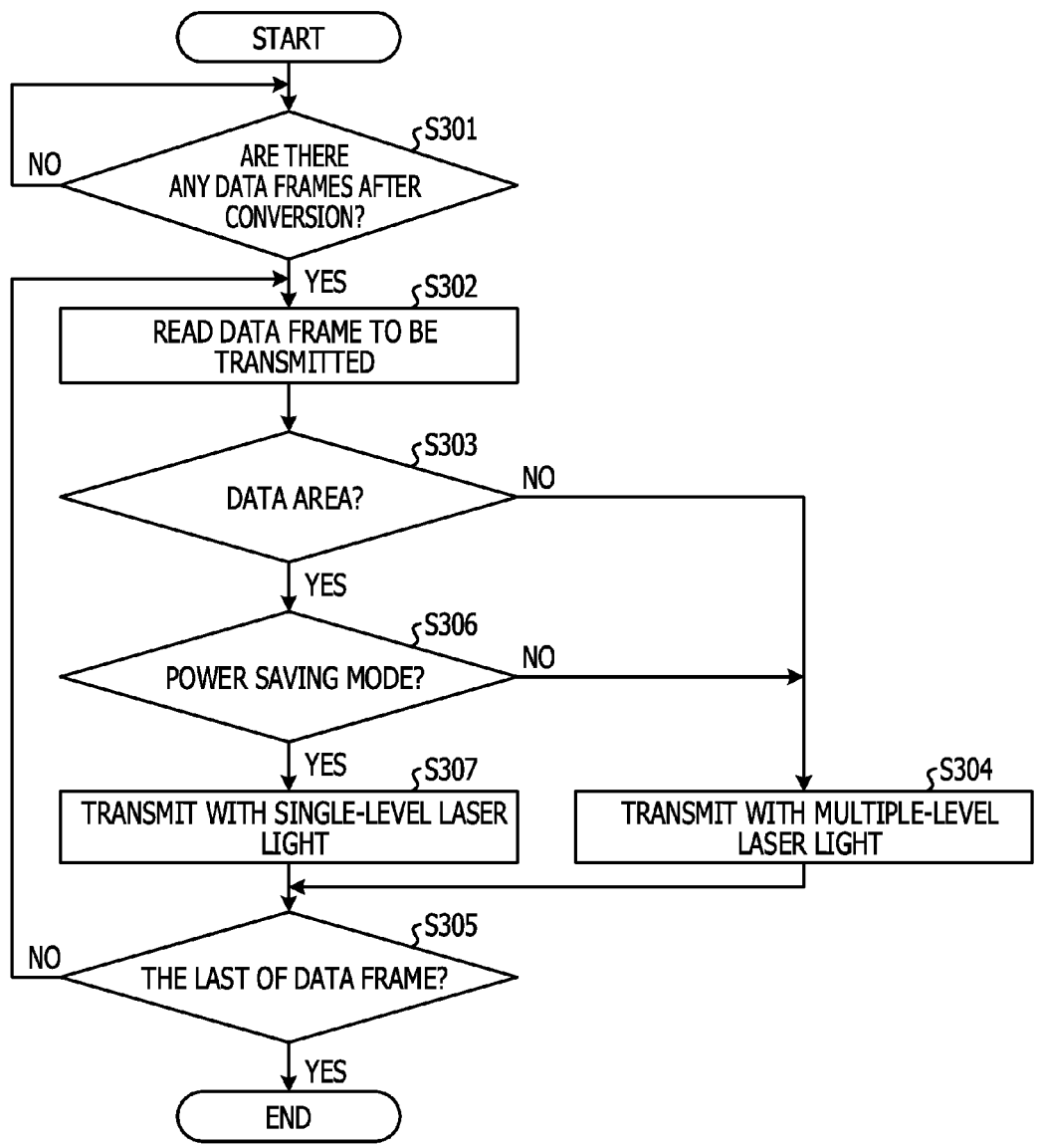
FIG. 9 is a flowchart illustrating a flow of data transmission processing performed by the server according to the first embodiment.

FIG. 9 is a flowchart illustrating a flow of data transmission processing performed by the server according to the first embodiment. As illustrated in FIG. 9, if there is a data frame after conversion (S301: Yes), the output unit 27 of the server 10 reads the data frame to be transmitted (S302).

Then, if the read data is not data from the data area of the data frame (S303: No), the output unit 27 transmits the read data to a destination storage apparatus 100 using the multilevel laser light (S304).

After that, if the transmitted data is the last data frame (EOF) (S305: Yes), the output unit 27 terminates the processing. On the other hand, if the transmitted data is not the last data frame (EOF) (S305: No), the processing of output unit 27 returns to S302, reads the next data, and repeats the processing after that.

In S303, if the output unit 27 determines that the read data is data in the data area of the data frame (S303: Yes), the output unit 27 determines whether the transmission mode is the power saving mode or not (S306).

Then, if the output unit 27 determines that the transmission mode is not the power saving mode, but the normal mode (S306: No), the processing of S304 is performed. On the other hand, if the output unit 27 determines that the transmission mode is the power saving mode (S306: Yes), the output unit 27 transmits the read data to a destination storage apparatus 100 using the single level laser light (S307). After that, the output unit 27 performs the processing of S305.

In this manner, it is possible for the server 10 to change the laser light either MLC or SLC for each frame, thus it is possible to change the transmission modes while the apparatus is in operation without stopping the apparatus. Thereby, it is possible to achieve electric power saving. For example, if changed to binary data, the current consumption is reduced, but the communication time might become long. However, even if an upper limit value is set to the power allowed to be supplied to a server, in the case of binary laser light, it is possible to transmit a current within the upper limit value, and to maintain the system performance. As a result, this brings about shortening in communication time.

As a result, even if the server 10 is in a data transfer state by MLC, it is possible to automatically reduce power consumption during a time period having little traffic, such as at night, or the like. Also, it becomes possible to perform stable operation at the time of disaster recovery, and at the time of normal operation by low power consumption operation.

When the server 10 transmits a data frame using the SLC laser light, the server 10 performs transmission using the laser light of the lowest level MLC. Thereby, it is possible to change the optical levels by one light source, and thus to reduce cost.

The server 10 transmits only the data in the data area of the data frame by SLC, and transmits the data in the other area by MLC. Accordingly, it is possible to achieve electric power saving without using a special data frame, but using a general data frame used in an FC. It is easy to apply this method to an existing system, and to expect electric power saving of the overall data center.

The received side of the data frame refers to the header so that the received side is allowed to determine whether the data area is in the four-valued notation or in the binary notation. Accordingly, it is possible to perform reception processing of a data frame without performing complicated processing. As a result, it is possible to achieve both an increase in speed of data transfer, and electric power saving.

Second Embodiment

In the first embodiment, a description has been given of the case where the switch 50 directly relays the received data frame both in the case of a four-valued data frame or a binary data frame. However, the present disclosure is not limited to this.

For example, when the switch 50 receives a data frame from the server 10 or the storage apparatus 100, it is possible for the switch 50 to change the transmission mode between the normal mode and the power saving mode. That is to say, it is possible for the switch 50 to convert the data set in the data area of the data frame.

Thus, in a second embodiment, a description will be given of the case in which the switch 50 performs conversion processing on the data frame received from the server 10, and then relays the data frame to the storage apparatus 100 as an example. The overall configuration is the same as that of the first embodiment, and thus the detailed description will be omitted.

Figure 10:
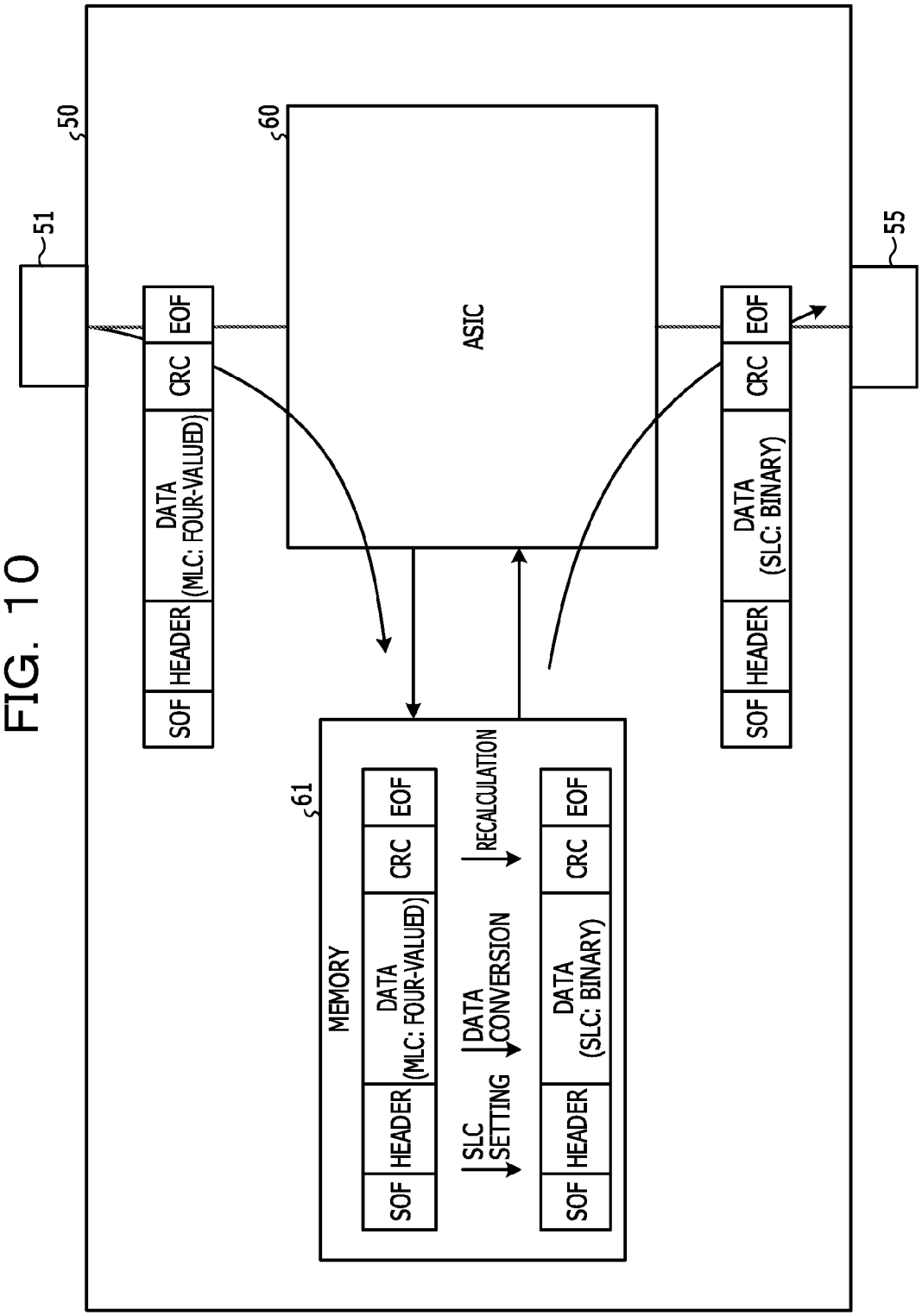
FIG. 10 is an explanatory diagram of processing executed by a switch according to a second embodiment.

FIG. 10 is an explanatory diagram of processing executed by the switch according to the second embodiment. In FIG. 10, a description will be given of an example in which the switch 50 converts the data frame in the power saving mode when the switch 50 receives and relays a four-valued data frame, as an example.

As illustrated in FIG. 10, the switch 50 receives a data frame at a port 51. Then, the ASIC 60 of the switch 50 stores the received data frame into the memory 61. After that, since the power saving mode is set, the ASIC 60 performs conversion into binary data.

Specifically, the ASIC 60 converts the four-valued data stored in the data area of the received data frame by the method described in FIG. 5 into binary data. Then, the ASIC 60 sets a flag indicating that the data is binary data in the header of the received data frame. Further, the ASIC 60 recalculates the CRC of the received data frame, and sets the CRC again.

After that, the ASIC 60 reads the converted data frame, which has been subjected to the data area conversion, the header setting, and the CRC recalculation from the memory 61. Then, the ASIC 60 transmits the data frame to the destination storage apparatus 100 through the port 55.

Figure 11:
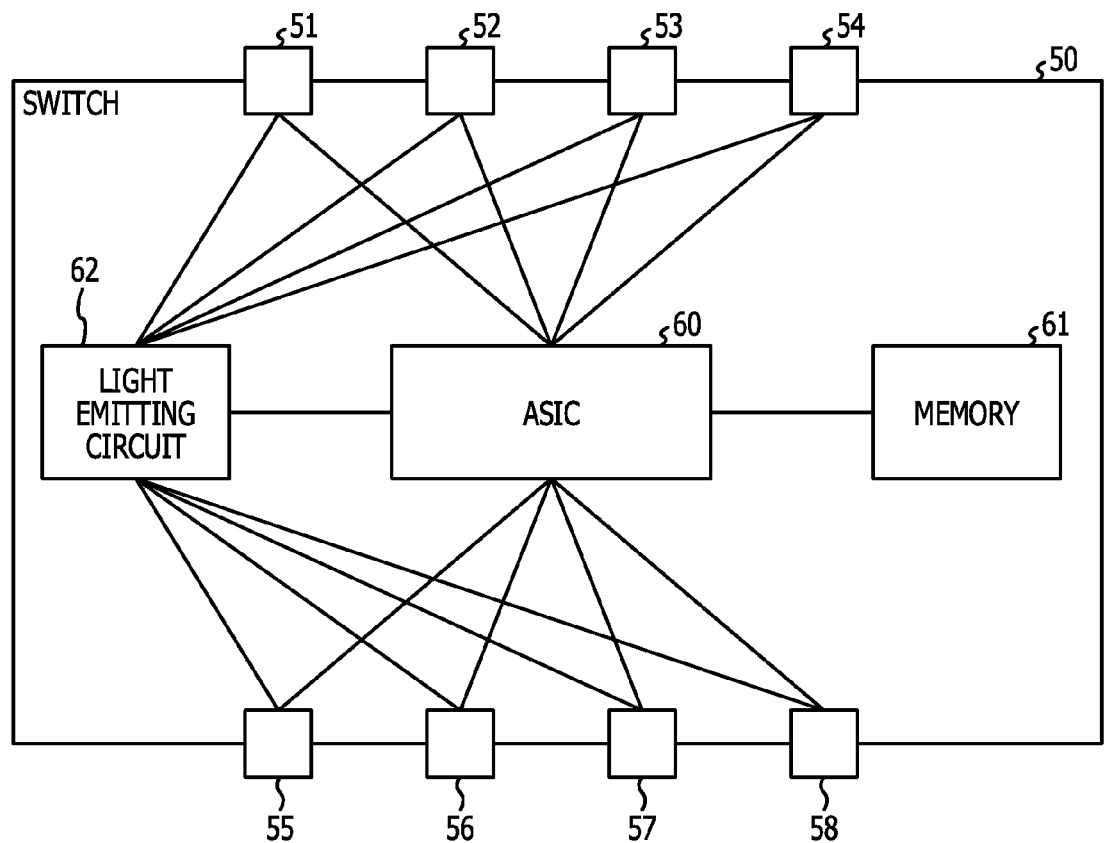
FIG. 11 is a diagram illustrating an example of a hardware configuration of the switch according to the second embodiment.

FIG. 11 is a diagram illustrating an example of a hardware configuration of the switch according to the second embodiment. As illustrated in FIG. 11, the switch 50 includes ports 51 to 58, an ASIC 60, a memory 61, and a light emitting circuit 62.

Each of the ports is connected to the server 10 or the storage apparatus 100 using fiber channels, and executes reception of a data frame, and transmission of a data frame.

The ASIC 60 is a processing unit that controls processing of the overall switch 50. The ASIC 60 performs determination of the transmission mode, data conversion, and the like. For example, the ASIC 60 determines whether in the normal mode or the power saving mode depending on the existence of the external setting, or the amount of traffic in the same manner as the server 10.

Then, when the ASIC 60 has determined to relay in the normal mode, the ASIC 60 refers to the header of the received data frame. Then, when the flag (for example, 0100) indicating that the data is binary is not set in the header, the ASIC 60 determines that the received data frame is in the four-valued notation, and relays the received data frame to the destination without change.

On the other hand, when a flag indicating that the data is binary is set in the header, the ASIC 60 determines that the received data frame is in the binary notation. Then, the ASIC 60 converts the data to be stored in the data area of the reception data frame into data in the four-valued notation. Further, the ASIC 60 sets a flag (for example, 0000) indicating the four-valued in the header of the received data frame, and performs recalculation of the CRC. After that, the ASIC 60 relays the converted data frame to the destination.

When determined to relay in the power saving mode, the ASIC 60 refers to the header of the received data frame. Then, when the flag (for example, 0100) indicating binary is set in the header, the ASIC 60 determines that the received data frame is in the binary notation, and relays the received data frame to the destination without change.

On the other hand, when the flag indicating binary is not set in the header, the ASIC 60 determines that the received data frame is in the four-valued notation. Then, the ASIC 60 converts the data stored in the data area of the received data frame into data in the binary notation. Further, the ASIC 60 sets the flag indicating binary in the header of the received data frame, and performs recalculation of CRC. After that, the ASIC 60 relays the data frame after conversion to the destination.

The memory 61 is a storage device for storing various programs and data. The memory 61 temporarily stores the received data frame. The light emitting circuit 62 transmits the data frame input from the ASIC 60 to the destination in the mode instructed from the ASIC 60. The light emitting circuit 62 has the same functions as those of the SFP 12 described in FIG. 2, and thus a detailed description will be omitted here.

Figure 12:
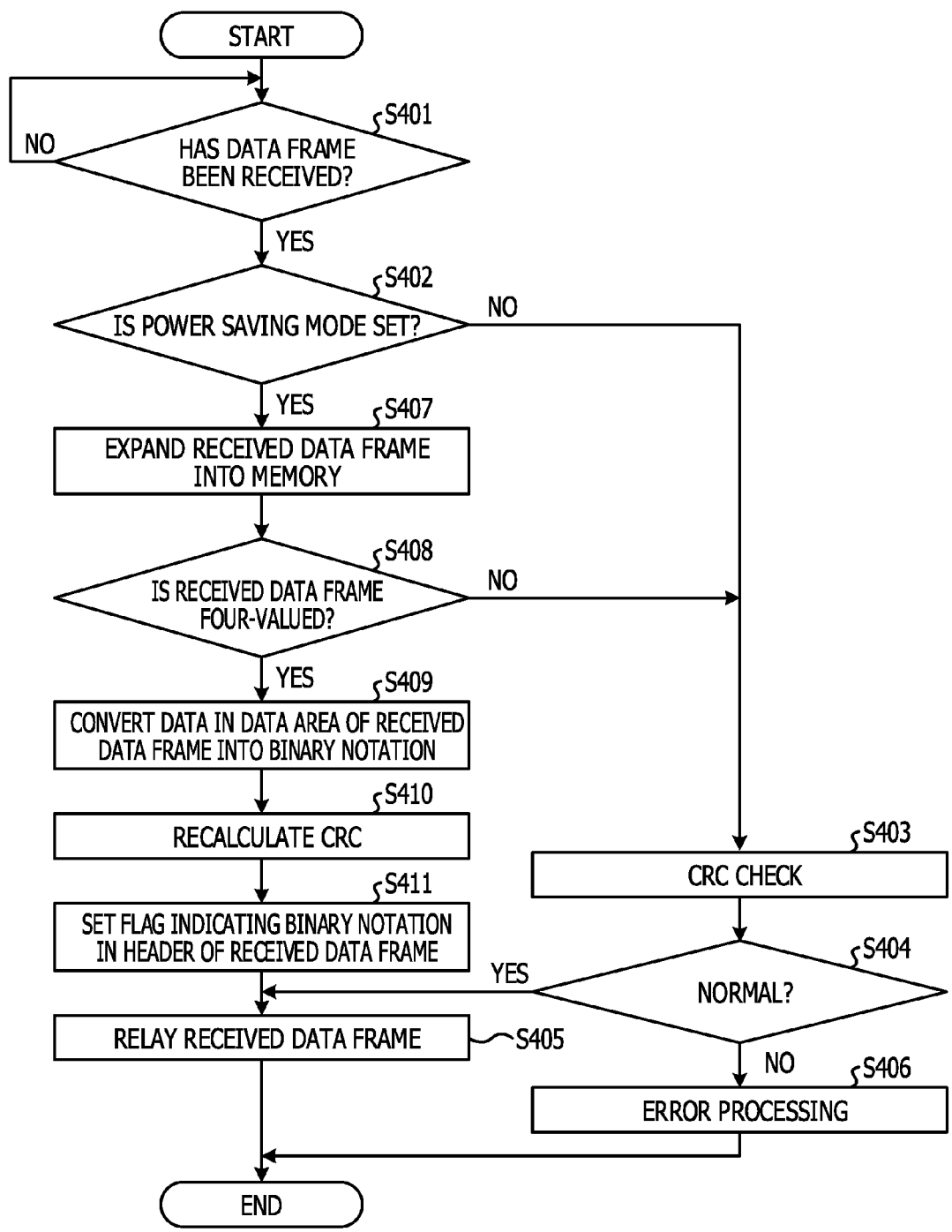
FIG. 12 is a flowchart illustrating data relay processing executed by the switch according to the second embodiment.

FIG. 12 is a flowchart illustrating data relay processing executed by the switch according to the second embodiment. As illustrated in FIG. 12, when the ASIC 60 of the switch 50 receives a data frame (S401: Yes), the ASIC 60 determines whether the power saving mode is set or not (S402). For example, when there has been a switching instruction to the power saving mode from the outside or when the amount of traffic is equal to or less than a threshold value, the ASIC 60 determines that the power saving mode is set.

Then, if the power saving mode is not set (S402: No), the ASIC 60 checks the CRC of the received data frame (S403). If the CRC is normal (S404: Yes), the ASIC 60 relays the received data frame to the destination (S405). On the other hand, if the ASIC 60 has detected abnormality by checking the CRC of the received data frame (S404: No), the error processing is performed (S406).

For example, the ASIC 60 refers to the header of the received data frame, and if the ASIC 60 has determined that the data frame is in the four-valued notation, the ASIC 60 transmits the received data frame to the destination using the multilevel laser light. If the ASIC 60 has determined that the data frame is in the binary notation by referring to the header of the received data frame, the ASIC 60 changes the transmission mode from the multilevel laser light to the single level laser light at the time of transmission of the data area, and transmits the received data frame to the destination.

In S402, if the power saving mode is set (S402: Yes), the ASIC 60 expands the received data frame into the memory 61 (S407). Next, the ASIC 60 refers to the header of the received frame, and determines whether the received data frame is in the four-valued notation or not (S408). That is to say, a determination is made of whether the data in the received data frame is in the four-valued notation or not.

Then, if the ASIC 60 has determined that the received data frame is not in the four-valued notation, but in the binary notation (S408: No), the ASIC 60 performs the processing of S403 and thereafter.

On the other hand, if the ASIC 60 has determined that the received data frame is in the four-valued notation (S408:

Yes), the ASIC 60 converts the data in the data area of the reception data frame into the binary notation (S409), and recalculates the CRC (S410).

After that, the ASIC 60 sets a flag indicating the binary notation in the header of the received data frame having been subjected to the data area conversion, and the recalculation of the CRC (S411). Then, the ASIC 60 transmits the data other than the data area of the data frame after conversion using the multilevel laser light. Then, the ASIC 60 transmits the data in the data area of the data frame after conversion using the single level laser light (S405).

In this manner, it is possible for the switch 50 itself to determine whether it is now in the power saving mode or not, and to automatically change the optical levels. Accordingly, in the case where a network environment has changed from the point in time when the server 10 has transmitted a data frame, it is possible for the switch 50 to change between the power saving mode and the normal mode, and thus to achieve efficient power saving operation.

Third Embodiment

It is possible to carry out the present disclosure in various different modes other than the above-described embodiments.

It is possible for the storage apparatus 100 illustrated in FIG. 1 to perform the same functions as those of the server 10 described in the first embodiment, and the switch 50 described in the second embodiment. That is to say, when the storage apparatus 100 responds to a received data stream, it is possible for the storage apparatus 100 not only to make a response using the notation used in the reception data stream, but also to make a response based on the result of determination on whether in the power saving mode or not.

In the above embodiments, the descriptions have been given of the examples in which the server 10 or the switch 50 transmit only the data area of the data frame using the single level laser light in the power saving mode. However, the present disclosure is not limited to this. For example, if the transmission source and the transmission destination are synchronized in use of either of the modes, it is possible for the server 10, and the like to transmit all the data frames using the single level laser light.

To give an example, it is assumed that the server 10, the switch 50, and the storage apparatus 100 cooperatively determine that the normal mode is used in a time period T1, and the power saving mode is used in a time period T2. In this case, when the server 10 transmits a data frame in the time period T2, the server 10 transmits all of the data frame using the single level laser light.

Each configuration of the illustrated apparatuses does not have to be exactly configured physically as illustrated in the drawings. That is to say, the apparatuses may be configured by distributing or integrating components by any units. Further, each of the processing functions performed by each apparatus may be achieved totally or partially by a CPU, and a program interpreted and executed by the CPU, or, by hardware using a wired logic.

Among each processing described in the embodiments, all of or a part of the processing described to be performed automatically may be manually performed. Alternatively, all of or a part of the processing described to be performed manually may be automatically performed by a publicly known method. Moreover, it is possible to freely change information including the processing procedures described in the above-described documents and the drawings, the control procedures, the specific names, various kinds of data and parameters unless otherwise described in particular.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of communication through an optical communication network, executed by processor included in a communication apparatus that performs transmission by selecting a transmission mode, the method comprising:
   measuring an amount of data traffic of the optical communication network for each unit time when transmitting data;
   determining whether the measured amount of traffic data is equal to or more than a threshold value;
   transmitting the data using first optical signals having different levels in light intensity that indicate different numerical values when it is determined that the measured amount of traffic data is equal to or more than the threshold value; and
   transmitting the data using second optical signals having different levels in light intensity that indicate different numerical values, a number of types of the first optical signals being fewer than a number of types of the second optical signals, when it is determined that the measured amount of traffic data is not equal to or more than the threshold value.

2. The method according to claim 1,
   wherein the transmitting the data using the first optical signals includes:
   setting, by the processor, four-valued notation data to be transmitted into a data area of a data frame, and setting, by the processor, an identifier indicating a four-valued notation into a header area of the data frame when it is determined that the measured amount of traffic data is equal to or more than the threshold value, and
   wherein the transmitting the data using the second optical signals includes:
   setting, by the processor, binary notation data to be transmitted into the data area, and setting, by the processor, an identifier indicating a binary notation into the header area of the data frame when it is determined that the measured amount of traffic data is not equal to or more than the threshold value.

3. The method according to claim 2, further comprising:
   transmitting by switching from the first mode to the second mode when transmitting second data stored in the data area.

4. The method according to claim 2, wherein
   the communication apparatus is coupled to a relay apparatus using a fiber channel, and
   the relay apparatus is configured to:
   receive the data frame from the communication apparatus,
   determine that the data frame is in the binary notation when the identifier indicating the binary notation is set in the header area of the data frame, and determine that the data frame is in the four-valued notation when the identifier indicating the binary notation is not set in the header area of the data frame.

5. The method according to claim 1, wherein the second optical signals are two optical signals selected from among the first optical signals and the two optical signals indicate binary values.

6. The method of communication according to claim 1, wherein the determining includes determining to transmit the data using the second optical signals when the communication apparatus has received an instruction to transmit using the second optical signals from another apparatus coupled to the communication apparatus.

7. The method according to claim 1, wherein the determining includes determining whether the measured amount of traffic data is equal to or more than a threshold value for each frame when transmitting a plurality of frames.

8. A communication apparatus that performs communication in an optical communication network, the communication apparatus comprising:
a memory; and
a processor coupled to the memory and configured to:
measure an amount of data traffic of the optical communication network for each unit time when transmitting data;
determine whether the measured amount of traffic data is equal to or more than a threshold value;
transmit the data using first optical signals having different levels in light intensity that indicate different numerical values when it is determined that the measured amount of traffic data is equal to or more than the threshold value; and
transmit the data using second optical signals having different levels in light intensity that indicate different numerical values, a number of types of the first optical signals being fewer than a number of types of the second optical signals, when it is determined that the measured amount of traffic data is not equal to or more than the threshold value.

9. The communication apparatus according to claim 8, wherein
the data is transmitted as a data frame from the communication apparatus, and
the processor is further configured to:
set four-valued notation data to be transmitted into a data area of the data frame, and set an identifier indicating a four-valued notation into a header area of the data frame, before transmitting the data frame, when it is determined that the measured amount of traffic data is equal to or more than the threshold value; and
set binary notation data to be transmitted into the data area, and set an identifier indicating a binary notation into the header area of the data frame, before transmitting the data frame, when it is determined that the measured amount of traffic data is not equal to or more than the threshold value.

10. The communication apparatus according to claim 9, wherein the processor is configured to transmit the identifier indicating the binary notation corresponding to the data using the first optical signals when it is determined that the measured amount of traffic data is not equal to or more than the threshold value.

11. The communication apparatus according to claim 9, wherein the second optical signals are two optical signals selected from among the first optical signals and the two optical signals indicate binary values.

12. The communication apparatus according to claim 9, wherein the processor is configured to determine to transmit the data using the second optical signals when an instruction to transmit using the second optical signals from another apparatus coupled to the communication apparatus.

13. The communication apparatus according to claim 9, wherein the processor is configured to determine to determine whether the measured amount of traffic data is equal to or more than a threshold value for each frame when transmitting a plurality of frames.

14. A communication system that performs communication by selecting a transmission mode, the communication system comprising:
a communication apparatus; and
a relay apparatus coupled to the communication apparatus,
wherein a processor included in the communication apparatus is configured to:
measure an amount of data traffic of the optical communication network for each unit time when transmitting data;
determine whether the measured amount of traffic data is equal to or more than a threshold value;
transmit the data using first optical signals having different levels in light intensity that indicate different numerical values when it is determined that the measured amount of traffic data is equal to or more than the threshold value; and
transmit the data using second optical signals having different levels in light intensity that indicate different numerical values, a number of types of the first optical signals being fewer than a number of types of the second optical signals, when it is determined that the measured amount of traffic data is not equal to or more than the threshold value.

15. The communication system according to claim 14, wherein a processor included in the relay apparatus is configured to:
receive the data from the communication apparatus, measure an amount of data traffic of the optical communication network for each unit time;
determine whether the measured amount of traffic data is equal to or more than the threshold value;
transfer the data using the first optical signals when it is determined that the measured amount of traffic data is equal to or more than the threshold value, and
transfer the data frame using the second optical signals when it is determined that the measured amount of traffic data is not equal to or more than the threshold value.

* * * * *